United States Patent [19]
Orikasa et al.

[11] Patent Number: 5,141,984
[45] Date of Patent: Aug. 25, 1992

[54] THERMOPLASTIC RESIN COMPOSITION AND METHOD FOR PREPARING THE SAME

[75] Inventors: Yuichi Orikasa, Yokohama; Suehiro Sakazume, Fujisawa, both of Japan

[73] Assignee: Nippon Petrochemicals Co., Ltd., Japan

[21] Appl. No.: 233,240

[22] Filed: Aug. 17, 1988

[30] Foreign Application Priority Data

Aug. 17, 1987 [JP] Japan .................. 62-203749
Oct. 27, 1987 [JP] Japan .................. 62-271276

[51] Int. Cl.⁵ .................. C08L 51/08; C08L 69/00; C08L 71/12; C08K 3/40
[52] U.S. Cl. .................. 524/494; 524/504; 524/508; 524/514; 525/66; 525/67; 525/68; 525/396; 525/397; 525/905
[58] Field of Search .................. 525/66, 67, 396, 397, 525/905; 524/508, 514, 504, 492

[56] References Cited
FOREIGN PATENT DOCUMENTS 62-27456  2/1987  Japan .................. 525/66
62-129342 6/1987  Japan .
62-129349 6/1987  Japan .
62-129351 6/1987  Japan .

*Primary Examiner*—Jacob Ziegler
*Attorney, Agent, or Firm*—Ostrolenk, Faber, Gerb & Soffen

[57] ABSTRACT

There is here provided a thermoplastic resin composition which comprises (I) 99 to 1% by weight of a polyamide resin, (II) 1 to 99% by weight of at least one kind of resin selected from the group consisting of a polyphenylene ether resin, a mixture of the polyphenylene ether resin and a styrene polymer, and a polycarbonate resin, (III) 0.1 to 100 parts by weight, based on 100 parts by weight of the aforesaid resins (I)+(II), of a multiphase structure thermoplastic resin which is composed of 5 to 95% by weight of an epoxy group-containing olefin copolymer and 95 to 5% by weight of a vinyl polymer or copolymer obtained from at least one kind of vinyl monomer, either of both the components being formed with a dispersion phase having a particle diameter of 0.001 to 10 μm. A method for preparing the above-mentioned thermoplastic resin composition is also provided here.

4 Claims, 2 Drawing Sheets

E-GMA-g-PMMA  ⊢―⊣ 1μm

E-GMA-MMA  ⊢―⊣ 1μm

E-GMA/PMMA ⊢―⊣ 1μm

E-GMA-g-MMA ⊢―⊣ 1μm

THERMOPLASTIC RESIN COMPOSITION AND METHOD FOR PREPARING THE SAME

BACKGROUND OF THE INVENTION

(1) Field of the Invention

The present invention relates to a thermoplastic resin composition having excellent impact resistance, heat resistance, chemical resistance, moldability, dimensional stability and appearance of molded articles made therefrom. This composition of the present case can be widely utilized as materials for industrial parts, electrical and electronic machine parts, automobile parts and the like.

(2) Description of the Prior Art

Polyamides, polyphenylene ethers and polycarbonates are called the so-called engineering plastics. These compounds are believed to have mechanical properties, heat resistance, chemical resistance and the like, and they are used in many fields.

In recent years, with regard to the engineering plastics, new additional functions are demanded, and various attempts have been made. One of them is a composition comprising a combination of plural engineering plastics, and this composition has features of the respective plastics and is known as a polymer alloy.

For example, an alloy of a polyamide and a polyphenylene ether, and an alloy of a polyamide and a polycarbonate are known.

The polyamide is excellent in moldability and chemical resistance, but it has hygroscopicity and poor in dimensional stability and impact strength. For the purpose of solving the problem, a method has been suggested in which a polyphenylene ether is mixed with the polyamide. According to a different standpoint, this mixture also intends to improve moldability and solvent resistance which are drawbacks of the polyphenylene ether. However, these two resins are difficult to disperse into each other, and thus some methods for facilitating the dispersion are disclosed in, for example, Japanese Patent Unexamined Publication Nos. 56-16525, 56-49753, 56-47432, 57-36150 and 56-26913. Particularly in Japanese Patent Unexamined Publication Nos. 62-27456, 62-129342, 62-129349 and 62-129351, there are described examples using an epoxy group-containing monomer and a styrene copolymer or an o-olefin copolymer modified with an epoxy group-containing compound in order to improve compatibility.

However, in the ethylene copolymer having the epoxy group, the affinity for the polyamide is good but the affinity for the polyphenylene ether is poor, and for this reason, the improvement of the impact resistance is not sufficient.

When the polycarbonate is mixed with the polyamide to obtain sufficient compatibility, the impact strength of the polyamide resin can be heightened, and the solvent resistance and moldability of the polycarbonate can be effectively improved. Examples in which these two resins are mixed with each other are scarcely present, and any attempt has not been made to improve the compatibility.

SUMMARY OF THE INVENTION

The inventors of the present application have intensively researched to solve the above-mentioned problems, and as a result, they have found that when a specific multi phase structure thermoplastic resin is additionally blended as a compatibilizing agent, a composition can be obtained in which impact resistance and appearance of molded articles are excellent, with features of selected resins kept up, and the present invention has been completed.

The first aspect of the present intention is directed to a thermoplastic resin composition containing (I) 99 to 1% by weight of an polyamide resin, (II) 1 to 99% by weight of at least one kind of resin selected from the group consisting of a polyphenylene ether resin, a mixture of the polyphenylene ether resin and a styrene polymer, and a polycarbonate resin, (III) 0.1 to 100 parts by weight, based on 100 parts by weight of the aforesaid resins (I)+(II), of a multiphase structure thermoplastic resin which is composed of 5 to 95% by weight of an epoxy group-containing olefin copolymer and 95 to 5% by weight of a vinyl polymer or copolymer obtained from at least one kind of vinyl monomer, either of the components being formed with a dispersion phase having a particle diameter of 0.001 to 10 μm.

The second aspect of the present invention is directed to a method for preparing a thermoplastic resin composition which comprises the step of melting and mixing a polyamide resin (I) and at least one kind of resin (II) selected from the group consisting of a polyphenylene ether resin, a mixture of the polyphenylene ether resin and a styrene polymer, and a polycarbonate resin with 1 to 100% by weight of a graft polymerization precursor (A) which is obtained by first adding at least one vinyl monomer, at least one radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator, and raising the temperature of this aqueous suspension, when the degree of the impregnation has reached 50% by weight of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of the epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100 to 300° C. in order to form a multi-phase structure thermoplastic resin (III), and then melting and mixing the resin (III) with the resins (I) and (II).

BRIEF DESCRIPTION OF THE PHOTOGRAPHS

FIG. 1. is the electron microscope photograph of a multi-phase structure thermoplastic resin prepared in Preparation Example 2 in which spherical methyl methacrylate polymer particles having a diameter of 0.1 to 0.2 μm are dispersed in a base polymer matrix comprising ethyleneglycidyl methacrylate copolymer (E-GMA). This photograph is indicated with E-GMA-g-PMMA (multi-phase structure thermoplastic resin).

FIG. 2. is the electron microscope photograph of a random terpolymer (Reference Example 1) of an ethyleneglycidyl methacrylate (GMA)-methyl methacrylate prepared by high-pressure radical polymerization. This photograph is indicated with E-GMA-MMA (random terpolymer).

FIG. 3. is the electron microscope photograph of a blend composition (Reference Example 2) which is prepared by first blending E-GMA used in Preparation Example 1 with 30% by weight of polymethyl methacrylate (PMMA) and then mixing them under melting. This photograph is indicated with E-GMA/PMMA (blend polymer).

FIG. 4. is the electron microscope photograph of a short-chain graft polymer prepared by reacting E-GMA copolymer used in Preparation Example 1 with methyl methacrylate in a usual grafting manner. This photograph is indicated with E-GMA-g-MMA (short-chain graft polymer).

DETAILED DESCRIPTION OF THE INVENTION

Figure 1:
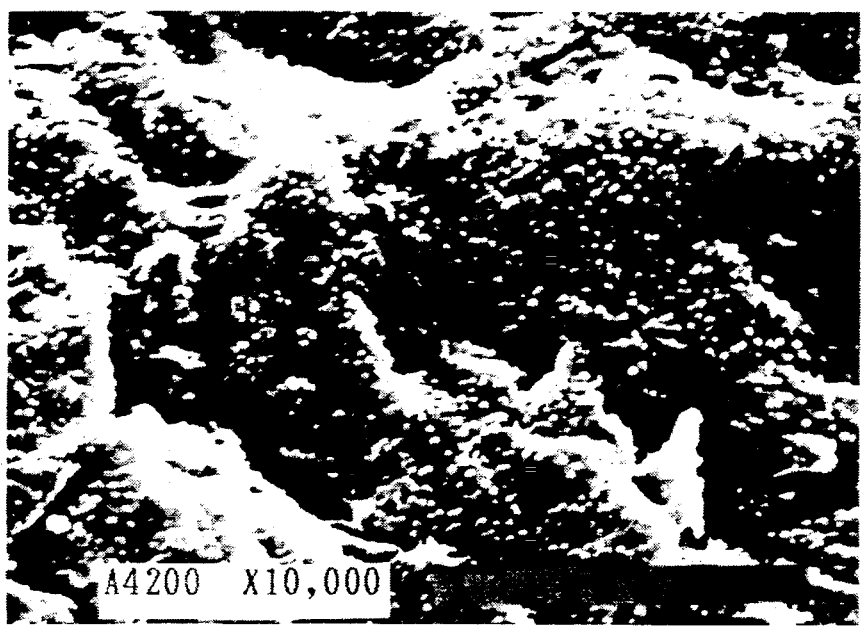
Figure 2:
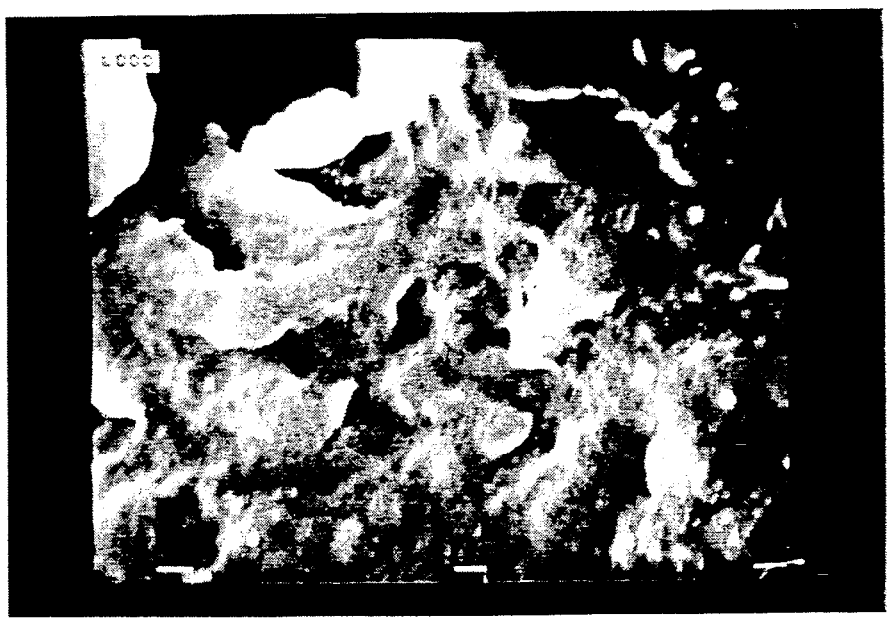
Figure 3:
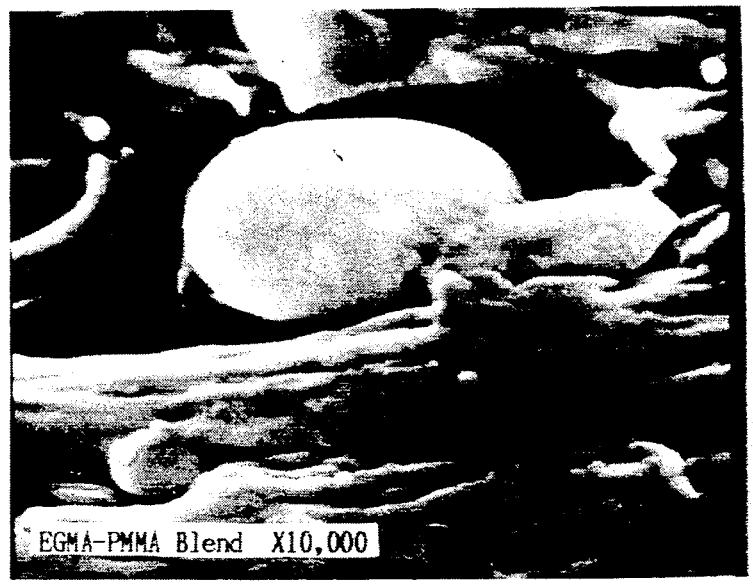
Figure 4:

Examples of a polyamide resin used in the present invention include aliphatic polyamide resins such as 6-nylon, 6,6-nylon, 6,10-nylon, 6,12-nylon, 11-nylon, 12-nylon and 4,6-nylon; aromatic polyamide resins such as polyhexamethylenediamine terephthalamide, polyhexamethylenediamine isophthalamide and xylene group-containing polyamide; modified compounds of these polyamides; and mixtures thereof. The particularly preferable polyamides are 6-nylon and 6,6-nylon.

The polyphenylene ether resin used in the present invention is a polymer obtained by oxidizing and polymerizing a phenolic compound represented by the general formula

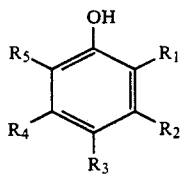

wherein each of $R_1$, $R_2$, $R_3$, $R_4$ and $R_5$ is selected from the group consisting of a hydrogen atom, a halogen atom, a hydrocarbon group or a substituted hydrocarbon group, and at least one of them is a hydrogen atom, with oxygen or an oxygen-containing gas in the presence of a coupling catalyst.

Typical examples of $R_1$, $R_2$, $R_3$, $R_4$ and $R_5$ in the above-mentioned general formula include hydrogen, chlorine, fluorine, iodine, bromine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl and ethylphenyl.

Typical examples of the phenolic compounds having the above-mentioned general formula include phenol, o-, m- and p-cresols, 2,6-, 2,5-, 2,4- and 3,5-dimethylphenols, 2-methyl-6-phenylphenol, 2,6 diphenylphenol, 2,6-dimethylphenol, 2-methyl-6-ethylphenol, and 2,3,5-, 2,3,6- and 2,4,6-trimethylphenols.

These phenolic compounds may be used in a combination of two or more thereof.

Other examples of the phenolic compound used in the present invention include copolymers of the phenolic compounds having the above general formula with divalent phenols such as bisphenol A, tetrabromobisphenol A, resorcin and hydroquinone.

Examples of the styrene polymer used in the present invention include homopolymers such as polystyrene, poly($\alpha$-methylstyrene) and poly(p-methylstyrene), polystyrenes modified with butadiene rubber, styrene-butadiene copolymer, ethylene-propylene copolymer and ethylene-propylene-diene copolymer, styrene-maleic anhydride copolymer, styreneacrylonitrile copolymer, styrene-acrylonitrile-butadiene copolymer and styrene-methylmethacrylate copolymer. The styrene copolymer is used in an amount of 0 to 95% by weight with respect to the polyphenylene ether resin.

The polycarbonate resin used in the present invention include 4,4-dioxyallylalkane polycarbonates typified by a polycarbonate of 4,4-dihydroxydiphenyl-2,2-propane (generally called bisphenol A), but above all, 4,4-dihydroxydiphenyl-2,2propane polycarbonate having a number average molecular weight of 15,000 to 80,000 is preferable. This polycarbonate may be prepared by an optional method. For example, 4,4-dihydroxydiphenyl-2,2-propane polycarbonate may be prepared by blowing phosgene in 4,4-dihydroxydiphenyl 2,2-propane as a dioxine compound in the presence of an aqueous caustic alkali solution and a solvent, or alternatively by carrying out ester interchange between 4,4-dihydroxydiphenyl-2,2-propane and diester carbonate in the presence of a catalyst.

The epoxy group containing olefin copolymer used in the multi-phase structure thermoplastic resin regarding the present invention is a copolymer of an olefin and an unsaturated glycidyl group-containing monomer, or a terpolymer of an olefin, an unsaturated glycidyl group-containing monomer and another unsaturated monomer, or a multicomponent copolymer. The particularly preferable olefin of the copolymer is ethylene, and the preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of maleic acid, crotonic acid and fumaric acid, allyl glycidyl ether, glycidyloxy ethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, $\alpha$, $\beta$-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and viny ethyl ether, and acrylic amide compounds. Particularly, acrylic and methacrylic esters are preferable.

Typical examples of the epoxy group-containing olefin copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethyleneglycidyl methacrylate copolymer, ethylene ethyl acrylateglycidyl methacrylate copolymer and ethylene-vinyl acetateglycidyl methacrylate copolymer are preferred.

These epoxy group-containing olefin copolymers can be used in a mixture thereof.

The above-mentioned epoxy group-containing olefin copolymer may be prepared preferably by a high pressure radical polymerization. That is, the epoxy group-containing olefin copolymer may be prepared by simultaneously or stepwise contacting and polymerizing a monomer mixture of 60 to 99.5% by weight of the above mentioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg/cm$^2$, preferably 1,000 to 3,500 kg/cm$^2$, at a reaction temperature of 50° to 400° C., preferably 100° to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocartons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Other examples of the epoxy group-containing olefin copolymer used in the present invention include modified compounds prepared by the addition reaction between the above-mentioned unsaturated glycidyl group-containing monomers and conventional olefin homopolymers and copolymers.

Examples of the above-mentioned olefin homopolymer include low-density, medium-density and high-density polyethylenes, polypropylene, polybutene-1 and poly-4-methylpentene-1, and examples of the above-mentioned copolymers include ethylene-propylene copolymer; ethylenebutene-1 copolymer; ethylene-hexene-1 copolymer; ethylene-4-methylpentene-1 copolymer; copolymers with other α-olefins mainly comprising ethylene such as ethyleneoctene-1 copolymer; copolymers with other α-olefins mainly comprising propylene such as propylene-ethylene block copolymer; ethylene-vinyl acetate copolymer; ethyleneacrylic acid copolymer; ethylene-methacrylic acid copolymer; copolymers of ethylene and methyl, ethyl, propyl, isopropyl and butyl acrylate and methacrylate; ethylene-maleic acid copolymer; ethylene-propylene copolymer rubber; ethylenepropylene-diene-copolymer rubber; liquid polybutadiene; etylene-vinyl acetate-vinyl chloride copolymer; and mixtures thereof.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, vinyl aromatic monomers, acrylonitrile and methacrylonitrile monomers and vinyl ester monomers are particularly preferable.

The multi-phase structure thermoplastic resin used in the present invention is an epoxy group-containing olefin copolymer or a vinyl polymer or copolymer matrix in which another vinyl polymer or copolymer, or epoxy group-containing olefin copolymer is uniformly dispersed in a spherical form.

The polymer dispersed in the matrix has a particle diameter of 0.001 to 10 μm, preferably 0.01 to 5 μm. When the particle diameter of the dispersed polymer is less than 0.001 μm or is more than 10 μm, compatibility to the resin is bad, with the result that, for example, the appearance of articles made therefrom deteriorates or the improvement effect of impact resistance is unpreferably insufficient.

The vinyl polymer or copolymer in the multi phase thermoplastic resin used in the present invention has a number average polymerization degree of 5 to 10,000, preferably 10 to 5,000.

When the number average polymerization degree is less than 5, impact resistance can not be improved, and inversely, when it is in excess of 10,000, melting viscosity is high, moldability deteriorates, and surface luster falls off unpreferably.

The multi-phase thermoplastic resin used in the present invention comprises 5 to 95% by weight, preferably 20 to 90% by weight, of the ethylene copolymer. Therefore, the content of the vinyl polymer or copolymer is 95 to 5% by weight, preferably 80 to 10% by weight.

When the content of the epoxy group-containing copolymer is less than 5% by weight, the improvement effect of impact resistance is poor, and inversely when it is in excess of 95% by weight, heat resistance is impaired unpreferably, though the impact resistance is sufficiently improved.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an epoxy group-containing olefin copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40° to 90° C. The mixture is then heated under conditions that the decomposition of the radical polymerization initiator does not occur substantially, in order to impregnate the ethylene copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the ethylene copolymer, thereby obtaining a graft polymerization precursor (A).

This graft polymerization precursor (A) also is the multi-phase structure thermoplastic resin. Therefore, the thus obtained graft polymerization precursor (A) may be directly melted and mixed with a polyamide resin and at least one resin selected from the group consisting of a polyphenylene ether resin, a mixture of the polyphenylene ether resin and a styrene polymer, and a polycarbonate resin.

Furthermore, the multi-phase thermoplastic resin (III) of the present invention can be obtained by kneading the graft polymerization precursor (A) under melting at 100° to 300° C. Alternatively, the epoxy group-containing olefine copolymer (B) or the vinyl polymer or copolymer (C) may be mixed with the graft polymerization precursor, and the mixture may be then kneaded under melting to obtain the multi-phase structure thermoplastic resin (III).

The most preferable multi-phase structure thermoplastic resin (III) can be obtained kneading the graft polymerization precursor.

The above-mentioned radical polymerizable or copolymerizable organic peroxides are compounds represented by the general formulae (a) and (b):

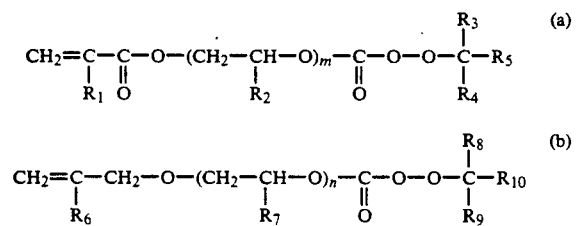

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxy acryloyloxyethyl carbonate, 1,1,3,3-tetramethylbutylperoxyacryloyloxyethyl carbonate, cumylperoxyacryloyloxyethyl carbonate, p-isopropylperoxyacryloyloxyethyl carbonate, t-butylperoxymethacryloyloxyethyl carbonate, t-amylperoxymethacryloyloxyethyl carbonate, 1,1,3,3-tetramethylbutylperoxymethacryloyloxyethyl carbonate, cumylperoxymethacryloyloxyethyl carbonate, p-isopropylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylperoxymethacryloyloxyethoxyethyl carbonate, t-butylperoxyacryloyloxyisopropyl carbonate, t-amylperoxymacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxyethyl carbonate, t butylperoxyallyl carbonate and t-butylperoxymethallyl carbonate.

In the present invention, amounts of the above-mentioned resins (I) and (II) depend upon a purpose of the composition of the present invention.

That is, when it is aimed that features of the polyamide resin are retained and poor dimensional stability and notched impact strength which are drawbacks of the resin are improved, there is required 50 to 99% by weight, preferably 60 to 95% by weight, of the polyamide resin.

When the polyamide resin is less than 50% by weight, excellent moldability and chemical resistance which are features of the polyamide resin are impaired, and when it is in excess of 99% by weight, the dimensional stability which is one of the purposes of the present invention is not improved sufficiently.

If it is aimed that the features of the polyphenylene ether are retained and the poor moldability and chemical resistance which are drawbacks of the polyphenylene ether are improved, there is required 50 to 99% by weight, preferably 60 to 95% by weight, of the polyphenylene ether.

When the amount of the polyphenylene ether is less than 50% by weight, heat resistance and dimensional stability of the polyphenylene ether are impaired, and when it is in excess of 99% by weight, the improvement effect of moldability and chemical resistance which is one of the purposes of the present invention is not obtained.

If it is aimed that chemical resistance and moldability are improved retaining the features of the polycarbonate, there is required 50 to 99% by weight, preferably 60 to 95% by weight, of the polycarbonate.

When the amount of the polycarbonate is less than 50% by weight, excellent impact resistance and stiffness which are the features of the polycarbonate is impaired, and when it is in excess of 99% by weight, the improvement effect of chemical resistance and moldability which is one of the purposes of the present invention is not obtained.

In the present invention, the multi-phase structure thermoplastic resin is used in an amount of 0.1 to 100 parts by weight, preferably 1 to 50 parts by weight, based on 100 parts by weight of the total weight of the resins (I)+(II).

When the amount of the multi-phase structure thermoplastic resin is less than 0.1 part by weight, any compatibility effect is not present, impact strength deteriorates, and delamination occurs on molded articles, with the result that the appearance of the articles is degraded. When it is in excess of 100 parts by weight, stiffness and heat resistance of the composition of the present invention deteriorate unpreferably.

In the present invention, the inorganic filler (IV) can be used in an amount of 1 to 150 parts by weight based on 100 parts of the components (I)+(II)+(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably. Inversely, when it is less than 1 part by weight, any modification effect cannot be exerted.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

The thermoplastic composition of the present invention may be manufactured by melting and mixing the above-mentioned components (I)+(II)+(III) at a temperature of 230° to 350° C.

The components (I), (II) and (III) may be mixed simultaneously, but it is preferred that after one of the components (I) and (II) and the component (III) are first melted and mixed, the other of the components (I) and (II) is then mixed with the resulting mixture. Particularly in the case of the resin which will be in the state of a disperse phase, it is suitable that such a resin is uniformly and finely mixed.

In melting and mixing, there may be used a usual kneader such as a mixing roll mill, a Banbury's mixer, a kneader mixer, a kneading extruder, a biaxial extruder and mixing rolls.

In the present invention, various additives can be used, in so far as they do not deviate from the gist of the present invention. Examples of such usable additives include another thermoplastic resin such as polyolefin resin, polyvinyl chloride resin, polyvinylidene chloride resin, ABS resin, fluorine-contained resin, polyoxymethylene resin, aromatic polyester resin, polysulfone resin or polyarylene sulfide resin, a natural rubber, a synthetic rubber, an inorganic flame retardant such as magnesium hydroxide or aluminum hydroxide, a usual halogen or phosphorus series flame retardant, an organic flame retardant, e.g., a halogenated polystyrene such as brominated polystyrene, brominated poly-$\alpha$-methylstyrene or a derivative thereof, a halognated polycarbonate such as borminated polycarbonate, a halogenated polyester such as polyalkylene tetrabromoterephthalate or brominated terephthalic acid series polyester, a halogenated epoxy compound such as halogenated bisphenol series epoxy resin, a hlogenated polyphenylene oxide compound such as poly(dibromophenylene oxide), and a high-molecular type halogen-containing polymer such as a cyanuric acid ester compound of halogenated bisphenol, a flame retardant auxiliary of an antimony compound such as antimony trioxide, antimony pentaoxide, antimony trichloride, antimony trisulfide, antimony pentasulfide, sodium antimonate, antimony tartrate or metallic antimony, an antioxidant, an ultraviolet inhibitor, a lubricant, a dispersant, a foaming agent, a crosslinking agent, and a colorant.

Now, the present invention will be described in detail in reference to examples.

Preparation Example 1 (Preparation of Multi-phase Structure Thermoplastic Resin IIIa)

In a 5-liter stainless steel autoclave was placed 2,500 g of pure water, and 2.5 g of polyvinyl alcohol was dissolved therein as a suspending agent. In the solution was placed 700 g of ethylene-glycidyl methacrylate copolymer as an epoxy group-containing olefin copolymer (content of glycidyl methacrylate=15% by weight) (trade name Rexpearl J-3700; made by Nippon Petrochemicals Co., Ltd.), followed by stirring to suspend the copolymer therein in a nitrogen atmosphere. Separately, in 300 g of styrene as a vinyl monomer were dissolved 1.5 g of benzoylperoxide as a radical polymerization initiator (trade name Nyper-B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above mentioned autoclave, followed by stirring.

Afterward, the autoclave was heated up to a temperature of 60° to 65° C., and stirring was then continued for 2 hours, so that the epoxy group-containing olefin copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor IIIa'. The styrene polymer was extracted from this graft polymerization precursor with ethyl acetate, and according to measurement by the use of GPC, the number average polymerization degree of the styrene polymer was 900.

Next, this graft polymerization precursor was extruded at 200° C. by a plastomill monoaxial extruder (Toyo Seiki Seisaku-sho Ltd.) to perform graft reaction, whereby a multi phase structure thermoplastic resin IIIa.

This multi-phase structure thermoplastic resin was then observed by a scanning type electron microscope (trade name JEOL JSM T300; made by JEOL, Ltd.), and it was found that it was a multi-phase structure thermoplastic resin in which spherical resin particles each having a diameter of 0.3 to 0.4 μm were uniformly dispersed. In this case, the grafting efficiency of the methyl methacrylate polymer was 49.0% by weight.

Preparation Example 2 (Preparation of Multi-phase Structure Thermoplastic Resin IIIb)

The same procedure as in Preparation Example 1 was repeated with the exception that 300 g of styrene as a vinyl monomer was replaced with 300 g of a methyl methacrylate monomer and 0.6 g of n-dodecylmercaptan as a molecular weight modifier was used, thereby preparing multi-phase structure thermoplastic resin IIIb via a graft polymerization precursor IIIa' (number average polymerization degree of methyl methacrylate polymer = 700). The average diameter of the resin particles dispersed in this resin composition was from 0.1 to 0.2 μm, as seen in Photograph No. 1 (E-GMA-g-PMMA).

Reference Example 1 (Preparation of Random Copolymer)

In a 3.8-liter reactor equipped with a stirrer were placed a mixture of 1,600 g of ethylene, 32 g of glycidyl methacrylate and 40 g of methyl methacrylate, and in the presence of 200 g of n-hexane as a chain transfer agent and 0.0012% by weight of a radical polymerization initiator (di-tert-butyl peroxide) based on the total weight of the mixture, reaction was then performed at a polymerization pressure of 1,600 kg/cm² at a reaction temperature of 170° C., thereby obtaining ethylene-glycidyl methacrylate-methyl methacrylate random terpolymer. Photograph No. 2 shows the observational result of the random terpolymer (E-GMA-MMA) by the use of an electron microscope.

The results indicate that the random copolymer does not have such a multi-phase structure as in the present invention.

Reference Example 2 (Preparation of Blend)

The epoxy group-containing ethylene copolymer used in Preparation Example 1 was blended with 30% by weight of polymethyl methacrylate (trade name Acrypet MD; made by Mitsubushi Rayon Co., Ltd.), and they were mixed at 250° C. under melting. The blend was observed through an electron microscope, and the results are shown in Photograph No. 3 (E-GMA/PMMA).

In the blend, a particle size of the dispersed polymethyl methacrylate is great, and therefore the structure of the polymer is noticeably different from the multi-phase structure of the present invention.

Reference Example 3

In a high-speed shear mixer, 950 g of ethylene-glycidyl methacrylate copolymer used in Preparation Example 1 was mixed, at ordinary temperature for 5 minutes, with a solution in which 0.5 g of dicumyl peroxide (trade name Percumyl D; made by Nippon Oils & Fats Co., Ltd.) was dissolved in 50 g of methyl methacrylate. The mixture was then extruded at 200° C. by an extruder, and graft reaction was performed in a usual grafting manner in order to obtain a short-chain graft polymer. The structure of the thus obtained graft polymer can be observed from the electron microscope photograph of Photograph No. 4 (E-GMA-g-MMA).

The results in the photograph indicate that the above-mentioned short-chain graft polymer does not have such a multi-phase structure as seen in the polymer prepared in Preparation Example 1, but a single-phase structure.

Examples 1 to 8

6,6-Nylon (trade name Amilan CM3001-N; made by Toray Industries, Inc.) (which was denoted by PA in tables), poly-2,6-dimethyl-1,4-phenylene ether (which was denoted by PPE in tables) having an intrinsic viscosity of 0.31 dl/g, modified PPE (trade name Nolyl 534J; made by Engineering Plastics Co., Ltd.) and the multi-phase structure thermoplastic resin IIIa obtained in Preparation Example 1 were melted and blended together in ratios in Table 1.

In melting and mixing the materials, they were first dry blended with one another and were then fed to a one-direction rotating diaxial extruder having a screw diameter of 30 mm a temperature of which was set to 280° C. Afterward, the mixture was extruded and then formed into grains. The thus formed resin was dried in an atmosphere of 150° C. for 3 hours.

Next, specimens were prepared therefrom by an injection molding machine having cylinder and mold temperatures of 320° C. and 90° C., respectively. Sizes of the specimens were as follows:

Specimens for notched izod impact strength: 13×65×6 mm

Specimens for heat distortion temperature: 13×128×6 mm

Specimens for tensile test: 13×220×6 mm

Test procedures were as follows:

(1) Notched izod impact strength: JIS K7110

(2) Heat distortion temperature: (18.6 kg/cm$^2$) JIS K7207

(3) Elongation at break JIS k7113

(4) Appearance of molded articles

Appearance of molded articles was ranked as follows by visually observing flow mark and luster.

(a) Presence of Flow Mark
O: Any flow mark was not present at all.
Δ: Flow marks were slightly present.
X: Flow marks were perceptibly present.

(b) Evaluation of Gloss
O: Luster was extremely good.
Δ: Luster was good.
X: Luster was bad.

(5) State of Delamination

The state of delamination was ranked as follows by visually observing the state of the broken surface of a molded article on which an adhesive tape was stuck and was then removed.

O: Delamination was not present at all.
Δ: Delamination was slightly present.
X: Delamination was perceptibly present.

(6) Gasoline Resistance

Gasoline resistance was estimated by observing occurred cracks on a specimen after the latter was immersed in gasoline at 25° C. for 5 hours.

O: Any cracks were not present.
X: Some cracks were present.

TABLE 1

|  | Example | | | | | | | |
|---|---|---|---|---|---|---|---|---|
|  | 1 | 2 | 3 | 4 | 5 | 6 | 7 | 8 |
| 6,6-Nylon (wt %) | 70 | 70 | 70 | 50 | 40 | 40 | 70 | 40 |
| PPE (wt %) | 30 | 30 | 30 | 50 | 60 | 60 | — | — |
| Modified PPE (wt %) | — | — | — | — | — | — | 30 | 60 |
| Multi-Phase Structure Thermoplastic Resin IIIa* | 5 | 10 | 20 | 10 | 10 | 20 | 20 | 20 |
| Notched Izot Impact Strength (kg · cm/cm) | 10 | 18 | 23 | 15 | 13 | 20 | 21 | 17 |
| Heat Distortion Temperature (°C.) (18.6 kg/cm$^2$) | 135 | 126 | 130 | 147 | 162 | 159 | 135 | 162 |
| Elongation at Break (%) | 90 | 105 | 150 | 95 | 95 | 110 | 140 | 102 |
| Appearance of Molded Article (flow mark) | O | O | O | O | Δ | O | O | O |
| Appearance of Molded Article (gloss) | O | O | O | O | O | O | O | O |
| State of Delamination | Δ | O | O | O | Δ | O | O | O |
| Gasoline Resistance | O | O | O | O | O | O | O | O |

*Parts by weight based on 100 parts by weight of PA + PPE.

EXAMPLE 9 to 13

The graft polymerization precursor obtained in Preparation Example 1 was used, and following the procedure of Example 1, evaluation was made. The results were shown in Table 2.

TABLE 2

|  | Example | | | | |
|---|---|---|---|---|---|
|  | 9 | 10 | 11 | 12 | 13 |
| 6,6-Nylon (wt %) | 70 | 50 | 40 | 70 | 40 |
| PPE (wt %) | 30 | 50 | 60 | — | — |
| Modified PPE (wt %) | — | — | — | 30 | 60 |
| Graft Polymerization Precursor IIIa'* | 10 | 10 | 20 | 10 | 20 |
| Notched Izot Impact Strength (kg · cm/cm) | 16 | 13 | 18 | 14 | 16 |
| Heat Distortion Temperature (°C.) (18.6 kg/cm$^2$) | 125 | 145 | 160 | 129 | 155 |
| Elongation at Break (%) | 100 | 103 | 100 | 95 | 93 |
| Appearance of Molded Article (flow mark) | O | O | O | O | O |
| Appearance of Molded Article (gloss) | O | O | O | O | O |
| State of Delamination | O | O | O | O | O |
| Gasoline Resistance | O | O | O | O | O |

*Parts by weight based on 100 parts by weight of PA + PPE.

EXAMPLES 14 to 19

There were mixed the multi-phase structure thermoplastic resin used in Example 1, the graft polymerization precursor used in Example 9, and a glass fiber as an inorganic filler having an average fiber length of 5.0 mm and a diameter of 10 μm in ratios in Table 3 give below with respect to 100 parts by weight of the above-mentioned resin components, and evaluation was made in the same manner as in Example 1. The results are set forth in Table 3.

TABLE 3

|  | Example | | | | | |
|---|---|---|---|---|---|---|
|  | 14 | 15 | 16 | 17 | 18 | 19 |
| 6,6-Nylon (wt %) | 70 | 70 | 70 | 40 | 40 | 40 |
| PPE (wt %) | 30 | 30 | 30 | 60 | 60 | 60 |
| Multi-phase Structure Thermoplastic Resin IIIa* | 15 | 15 | — | 15 | 15 | — |
| Graft Polymerization Precursor IIIa' (wt %)* | — | — | 15 | — | — | 15 |
| Glass Fiber** | 20 | 30 | 20 | 20 | 30 | 30 |
| Notched Izot Impact Strength (kg · cm/cm) | 7 | 8 | 8 | 9 | 8 | 9 |
| Heat Distortion Temperature (°C.) (18.6 kg/cm$^2$) | 200 | 220 | 195 | 210 | 225 | 205 |
| Elongation at Break (%) | 10 | 5 | 10 | 13 | 8 | 9 |
| Appearance of Molded Article (flow mark) | O | O | O | O | O | O |
| Appearance of Molded Article (gloss) | O | O | O | O | O | O |
| State of Delamination | O | O | O | O | O | O |
| Gasoline Resistance | O | O | O | O | O | O |

*Parts by weight based on 100 parts by weight of PA + PPE.
**Parts by weight based on 100 parts by weight of PA + PPE + IIIa (IIIa').

COMPARATIVE EXAMPLES 1 TO 3

The same evaluation as in Example 1 was made with the exception that the multi-phase structure thermoplastic resin in Example 1 was replaced with the ethylene-glycidyl methacrylate copolymer used in Preparation Example 1, the blend obtained in Reference Example 2, the short-chain graft polymer obtained in Reference Example 3, and a styrene-glycidyl methacrylate copolymer (glycidyl methacrylate content=10% by weight). The results are set forth in Table 4.

TABLE 4

|  | Comp. Example | | | | |
|---|---|---|---|---|---|
|  | 1 | 2 | 3 | 4 | 5 |
| 6,6-Nylon (wt %) | 70 | 70 | 70 | 70 | 70 |
| PPE (wt %) | 30 | 30 | 30 | 30 | 30 |
| Ethylene-Glycidyl Methacrylate Copolymer* | — | 20 | — | — | — |
| Blend* | — | — | — | 20 | — |
| Short-Chain Graft Polymer* | — | — | — | — | 20 |
| Styrene-Glycidy Methacrylate Copolymer* | — | — | 20 | — | — |
| Notched Izot Impact Strength (kg · cm/cm) | 5 | 10 | 7 | 2 | 5 |
| Heat Distortion Temp. (°C.) (18.6 kg/cm²) | 105 | 110 | 120 | 90 | 100 |
| Elongation at Break (%) | 70 | 130 | 100 | 20 | 85 |
| Appearance of Molded Article (flow mark) | X | X | ○ | X | X |
| Appearance of Molded Article (gloss) | X | ○ | Δ | X | Δ |
| State of Delamination | X | ○ | Δ | X | Δ |
| Gasoline Resistance | X | ○ | ○ | X | Δ |

*Parts by weight based on 100 parts by weight of PA + PPE.

EXAMPLES 20 TO 27

6,6-Nylon used in Example 1, a polycarbonate resin having a number average molecular weight of 62,000, and the multi-phase thermoplastic resin IIIa or IIIb obtained in Preparation Example 1 or 2 were melted and mixed with one another in ratios shown in Table 5.

Chemical resistance was evaluated by observing the appearance of a specimen after the latter was immersed in methanol at 75° C. for 30 days.

○ ... The specimen was not changed.
Δ ... Some cracks occurred on the specimen and the latter was partially dissolved.
X ... The specimen was noticeably dissolved.

TABLE 5

|  | Example | | | | | | | |
|---|---|---|---|---|---|---|---|---|
|  | 20 | 21 | 22 | 23 | 24 | 25 | 26 | 27 |
| 6,6-Nylon (wt %) | 20 | 20 | 20 | 40 | 40 | 50 | 70 | 70 |
| Polycarbonate (wt %) | 80 | 80 | 80 | 60 | 60 | 50 | 30 | 30 |
| Multi-Phase Structure Thermoplastic Resin IIIa* | 10 | 20 | — | 20 | — | 20 | — | 20 |
| Multi-Phase Structure Thermoplastic Resin IIIb* | — | — | 20 | — | 20 | — | 20 | — |
| Notched Izot Impact Strength (kg · cm/cm) | 80 | 91 | 86 | 78 | 70 | 65 | 35 | 30 |
| Heat Distortion Temperature (°C.) (18.6 kg/cm²) | 125 | 120 | 118 | 110 | 107 | 103 | 93 | 95 |
| Chemical Resistance (appearance) | ○ | ○ | ○ | ○ | ○ | ○ | ○ | ○ |

*Parts by weight based on 100 parts by weight of PA + polycarbonate.

EXAMPLES 28 TO 33

Table 6 shows examples in which the grafted multi-phase structure thermoplastic resin IIIa or IIIb in the above-mentioned examples was replaced with the graft polymerization precursor IIIa' or IIIb' obtained in Preparation Example 1 or 2. These examples exert the same functional effect as in the cases that the grafted multi-phase structure thermoplastic resin was used.

TABLE 6

|  | Example | | | | | |
|---|---|---|---|---|---|---|
|  | 28 | 29 | 30 | 31 | 32 | 33 |
| 6,6-Nylon (wt %) | 20 | 20 | 50 | 50 | 70 | 70 |
| Polycarbonate (wt %) | 80 | 80 | 50 | 50 | 30 | 30 |
| Graft Polymerization Precursor IIIa'* | 20 | — | 20 | — | 20 | — |
| Graft Polymerization Precursor IIIb'* | — | 20 | — | 20 | — | 20 |
| Notched Izot Impact Strength (kg · cm/cm) | 95 | 85 | 62 | 65 | 30 | 31 |
| Heat Distortion Temperature (°C.) (18.6 kg/cm²) | 123 | 122 | 105 | 103 | 90 | 93 |
| Chemical Resistance (appearance) | ○ | ○ | ○ | ○ | ○ | ○ |

*Parts by weight based on 100 parts by weight of PA + polycarbonate.

EXAMPLES 34 TO 39

Table 7 shows examples in which a glass fiber having an average fiber length of 5.0 mm and a diameter of 10 μm was additionally blended with the respective components in the above-mentioned examples.

TABLE 7

|  | Example | | | | | |
|---|---|---|---|---|---|---|
|  | 34 | 35 | 36 | 37 | 38 | 39 |
| 6,6-Nylon (wt %) | 20 | 20 | 40 | 40 | 70 | 70 |
| Polycarbonate (wt %) | 80 | 80 | 60 | 60 | 30 | 30 |
| Multi-Phase Structure Thermoplastic Resin IIIa* | 20 | — | 20 | — | — | — |
| Multi-Phase Structure Thermoplastic Resin IIIb* | — | 20 | — | — | — | — |
| Graft Polymerization Precursor IIIa'* | — | — | — | 20 | 20 | — |
| Graft Polymerization Precursor IIIb'* | — | — | — | — | — | 20 |
| Glass Fiber** | 30 | 30 | 30 | 30 | 30 | 30 |
| Notched Izot Impact Strength (kg · cm/cm) | 90 | 88 | 75 | 70 | 60 | 65 |
| Heat Distortion Temperature (°C.) (18.6 kg/cm²) | 135 | 131 | 123 | 128 | 125 | 129 |

*Parts by weight based on 100 parts by weight of PA + polycarbonate.
**Parts by weight based on 100 parts by weight of PA + polycarbonate + IIIa, IIIb, IIIa' or IIIb'.

COMPARATIVE EXAMPLES 6 to 15

The same procedure as in Example 1 was repeated with the exception that the multi-phase structure thermoplastic resin in Example 20 was replaced with the ethylene-glycidyl methacrylate copolymer used in Preparation Example 1, the blend obtained in Reference Example 2, and the short chain graft copolymer obtained in Reference Example 3. The results are set forth in Table 8.

TABLE 8

|  | Comp. Example | | | | | | | | | |
|---|---|---|---|---|---|---|---|---|---|---|
|  | 6 | 7 | 8 | 9 | 10 | 11 | 12 | 13 | 14 | 15 |
| 6,6-Nylon (wt %) | 20 | 20 | 20 | 50 | 50 | 70 | 20 | 20 | 70 | 70 |
| Polycarbonate (wt %) | 80 | 80 | 80 | 50 | 50 | 30 | 80 | 80 | 30 | 30 |
| Ethylene-Glycidyl Methacrylate Copolymer* | — | 10 | 20 | 10 | 20 | 20 | — | — | — | — |
| Blend* | — | — | — | — | — | — | 20 | — | 20 | — |
| Short-Chain Graft Copolymer* | — | — | — | — | — | — | — | 20 | — | 20 |
| Notched Izot Impact Strength (kg · cm/cm) | 2 | 12 | 17 | 10 | 15 | 8 | 3 | 10 | 4 | 6 |
| Heat Distortion Temperature (°C.) (18.6 kg/cm$^2$) | 82 | 80 | 75 | 73 | 72 | 70 | 65 | 70 | 63 | 65 |
| Chemical Resistance (appearance) | X | X | Δ | X | X | Δ | X | X | X | Δ |

*Parts by weight based on 100 parts by weight of PA + polycarbonate.

As described in the above-mentioned examples, the thermoplastic resin composition of the present invention, which has been prepared by using a specific multi-phase thermoplastic resin, can improve compatibility with other engineering plastics and can provide various molded articles which are excellent in impact resistance and appearance.

The thermoplastic resin composition of the present invention effectively has different features of the raw material resins, and it is excellent in moldability, impact resistance, heat resistance, dimensional resistance and chemical resistance. The impact resistance and heat resistance of the composition of the present invention can be regulated by suitably selecting a ratio of the multiphase structure thermoplastic resins to be mixed, and therefore the present invention can meet a variety of demands.

As is apparent from the foregoing, the thermoplastic resin composition of the present invention can be widely utilized as materials for, e.g., automobile parts, electrical and electronic machine parts, and other industrial parts.

What is claimed is:

1. A thermoplastic resin composition which comprises:
   (I) 99 to 1% by weight of a polyamide resin,
   (II) 1 to 99% by weight of at least one kind of resin selected from the group consisting of polyphenylene ether resin, a mixture of the polyphenylene ether resin and a styrene polymer, and a polycarbonate resin,
   (III) 0.1 to 100 parts by weight, based on 100 parts by weight of the aforesaid resins (I)+(II), of a multi-phase structure thermoplastic resin which is a graft copolymer of 5 to 95% by weight whose components are an epoxy group-containing olefin copolymer and 95 to 5% by weight of a vinyl polymer or copolymer obtained from at least one kind of vinyl monomer, either component being formed with a dispersion phase having a particle diameter of 0.001 to 10 μm, said multiphase structure thermoplastic resin prepared by melting and mixing a graft polymerization precursor obtained by copolymerizing at least one vinyl monomer with at least one radical polymerizable organic peroxide in the presence of a radical polymerization initiator in an aqueous suspension of an epoxy group-containing olefin copolymer at a temperature at which said radical polymerizable organic peroxide does not essentially decompose, said organic peroxide being represented by a formula selected from the group consisting of the following general formulae (a) and (b)

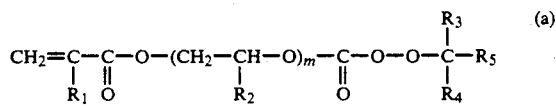

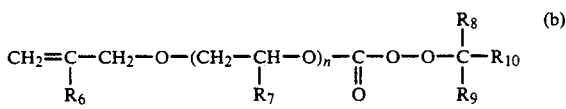

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2,
in particles of said epoxy group-containing olefin copolymer, and
said epoxy group-containing olefin copolymer consisting essentially of a copolymer composed of 60 to 99.5% by weight of ethylene, 40 to 0.5% by weight of glycidyl acrylate or methacrylate, and 0 to 39.5% by weight of another unsaturated monomer.

2. A thermoplastic resin composition according to claim 1 wherein the vinyl polymer or copolymer in the multi-phase structure thermoplastic resin has an average polyerization degree of 5 to 10,000.

3. A thermoplastic resin composition according to claim 1 wherein the vinyl monomer is at least one vinyl monomer selected from the group consisting of vinyl aromatic monomers, acrylonitrile and methacrylonitrile monomers, and vinyl ester monomers.

4. A thermoplastic resin composition according to claim 1 wherein an inorganic filler (IV) is additionally blended in an amount of 1 to 150 parts by weight based on 100 parts by weight of the thermoplastic resin composition (I)+(II)+(III).

* * * * *

UNITED STATES PATENT AND TRADEMARK OFFICE
CERTIFICATE OF CORRECTION

PATENT NO. : 5,141,984
DATED : August 25, 1992
INVENTOR(S) : Yuichi Orikasa, et. al.

It is certified that error appears in the above-indentified patent and that said Letters Patent is hereby corrected as shown below:

On the Title page, item [73], Assignee:"Nippon Petrochemicals Co., Ltd, Japan" to --Nippon Petrochemicals Co., Ltd. and Nippon Oil & Fats Co., Ltd., both of Japan--.

Signed and Sealed this

Fifth Day of April, 1994

Attest:

BRUCE LEHMAN

*Attesting Officer*  *Commissioner of Patents and Trademarks*